Jan 6, 1931.  H. B. GIACOMINI  1,787,742
HAND TRUCK
Filed June 14, 1929
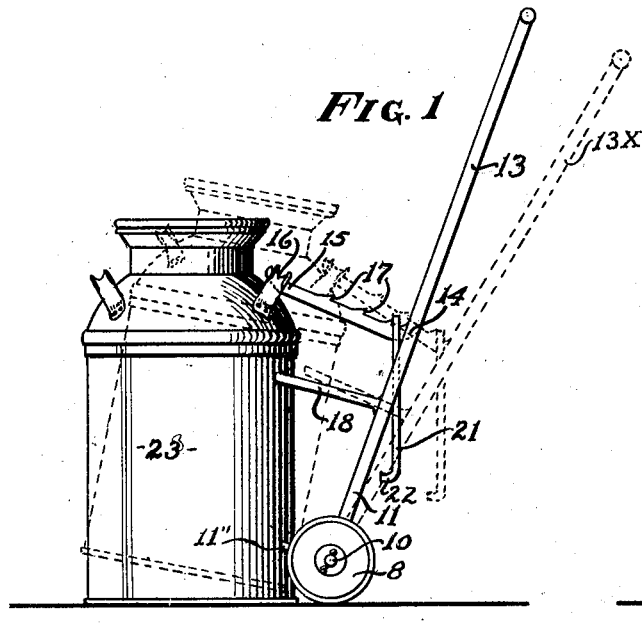
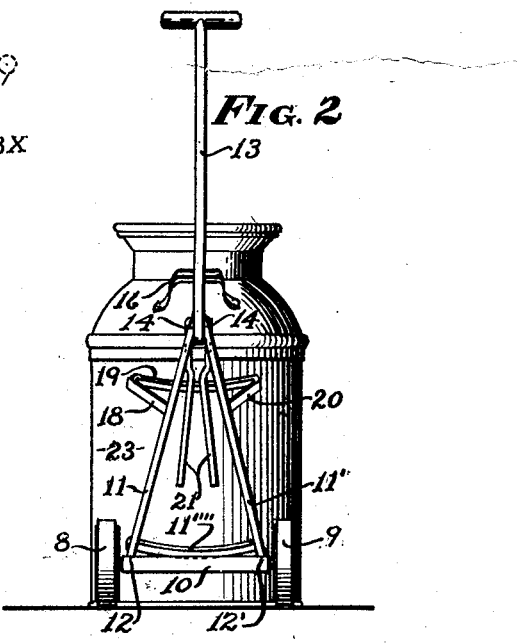
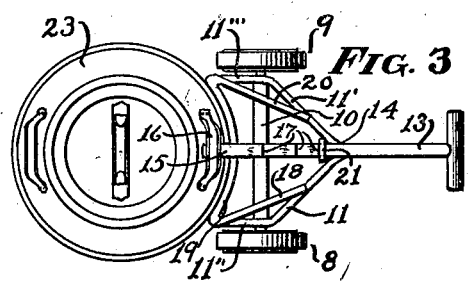
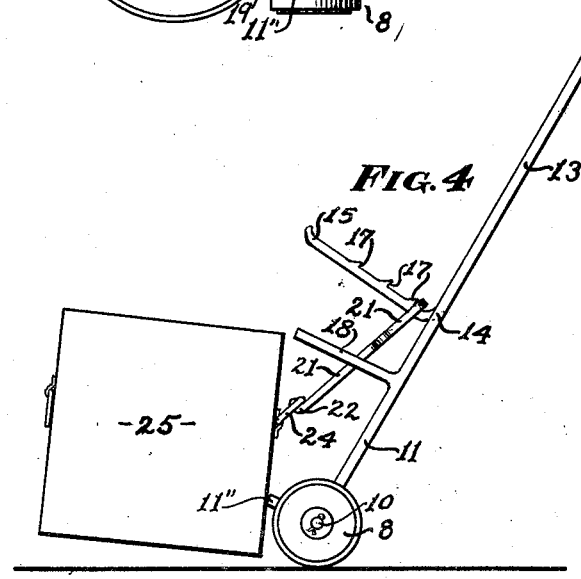
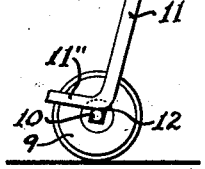
INVENTOR.
Hugo B. Giacomini
BY William C. Edwards Jr.
ATTORNEY.

Patented Jan. 6, 1931

1,787,742

UNITED STATES PATENT OFFICE

HUGO B. GIACOMINI, OF WICHITA, KANSAS

HAND TRUCK

Application filed June 14, 1929. Serial No. 370,991.

The invention relates to an improvement in hand trucks especially useful in handling cream cans, butter boxes and the like.

One object of the invention is to provide a hand truck which may be readily attached and detached from a cream can, or so that the can may be picked up and transported and then set down again without the heavy labor generally associated with this operation. Another object is to provide a hand truck which makes it impossible to drop or tip a can with the resultant loss of the contents or damage to the can. Another object is to make the same truck available for transporting other objects such as butter boxes and with equal advantages. These and other objects will appear during the description of the drawings.

In the drawings; Fig. 1 shows a side view of my improved truck assembly and in combination with a cream can for the purposes of the invention. Fig. 2 shows a rear view of Fig. 1. Fig. 3 is a top view of Fig. 1. Fig. 4 shows a side view of my improved truck as associated with butter box for transportation purposes. Fig. 5 is a side view of the lower part of the truck with the nearer wheel removed to illustrate the method of attaching the frame to the truck axle. Similar numerals of reference indicate corresponding parts throughout all the figures of the drawings.

Referring to the drawings; at 8 and 9 are the wheels of the truck as mounted upon an axle element 10. To this axle I weld a bar element comprising a pair of side arm elements 11 and 11' which are seen attached by welds at the points 12 and 12' to the axle 10. Forwardly from the points 12 and 12', the central part of the composite bars 11 and 11' as at 11" and 11'" project for a distance at right angles to their rear portions and then are connected by the curved central portion 11"" which is adapted to fit the contour of a cream can. The upper rear ends of this bar member as seen at 11 and 11' are welded to an L-shaped handle element 13—15 at the point 14 thereof or so that the hook portion 15 extends forwardly from the composite handle 11—11'—13 for the purposes later explained. Upon the projecting portion 14 are seen a plurality of projections 17. Forwardly projecting from the members 11 and 11' and integral therewith is seen a second bar member composed of the forward arms 18 and 20 connected to the curved cross element 19 also adapted to fit the contour of a cream can. A U-shaped bar 21 is hung over the member 14—15 and is adapted to seat behind any selected projection 17 as an adjusting feature later explained. The lower ends of the bar 21 form hooked ends 22 as seen.

In operation, I move my improved truck up to a cream can and engage the hook 15 with the handle 16 of the can 23, then by bearing down upon the handle 13 to the dotted position 13x the can 23 rests within the curved bars 11"" and 19 being suspended from the hook 15 and as seen in the dotted position seen in Fig. 1. Thus the base of the can is lifted off the floor and the truck may be pushed or pulled to any desired location and the upward tilt of the handle 13 will now lower the can again to the floor, the wheels 8 and 9 rolling back from the can and the hook 15 being released from the handle 16.

Fig. 4 shows the handle 24 on the butter box engaged by the hooks 22 of the U-shaped bar 21 which is properly adjusted in the proper projection 17 to fit the assemblage; then by tilting down the handle 13 the box 25 will be lifted off the floor so that it may be transported to a new location and dropped by disengaging the hooks 22 from the handle 24 as will be readily understood. The adjustment of the bar 21 upon the selected projection 17 governs the angle the truck will stand when it lifts the box from the floor. Such modifications may be employed as lie within the scope of the appended claim.

Having fully described my invention, what I now claim as new and desire to secure by Letters Patent is:

In a hand truck, a pair of wheels on an axle element; a handle element rigid with said axle having a base element forwardly projecting from said axle and forming a curved seat for a can support; and a second element above the base element, also fashioned as a curved seat for a can support and rigid with and forwardly projecting from said handle element; a forwardly extending element rigid with said handle and above the pair of curved seat elements and terminating in a hook and a plurality of projections upon the upper face of the forwardly extending element and intermediate its hooked end and said handle, and a U-shaped bar looped behind a selected projection, said bar terminating at its lower ends as paired hook elements.

In testimony whereof I affix my signature.

HUGO B. GIACOMINI.